Nov. 4, 1941.  J. A. LAWLER  2,261,728
ADJUSTABLE SEAT
Filed Jan. 9, 1939    2 Sheets-Sheet 1
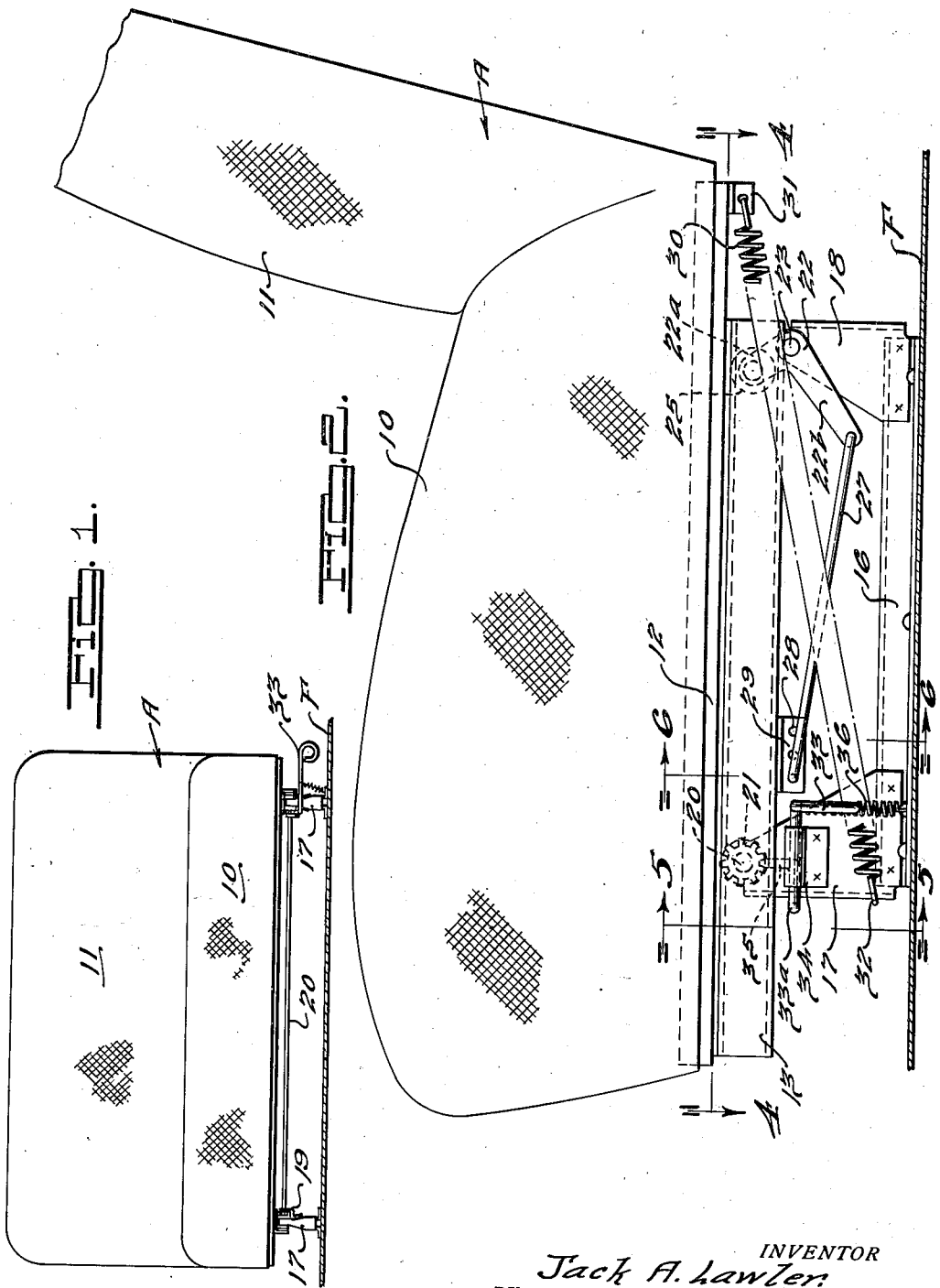
INVENTOR
Jack A. Lawler
BY
Dike, Calvert & Gray
ATTORNEYS.

Nov. 4, 1941.   J. A. LAWLER   2,261,728
ADJUSTABLE SEAT
Filed Jan. 9, 1939   2 Sheets-Sheet 2
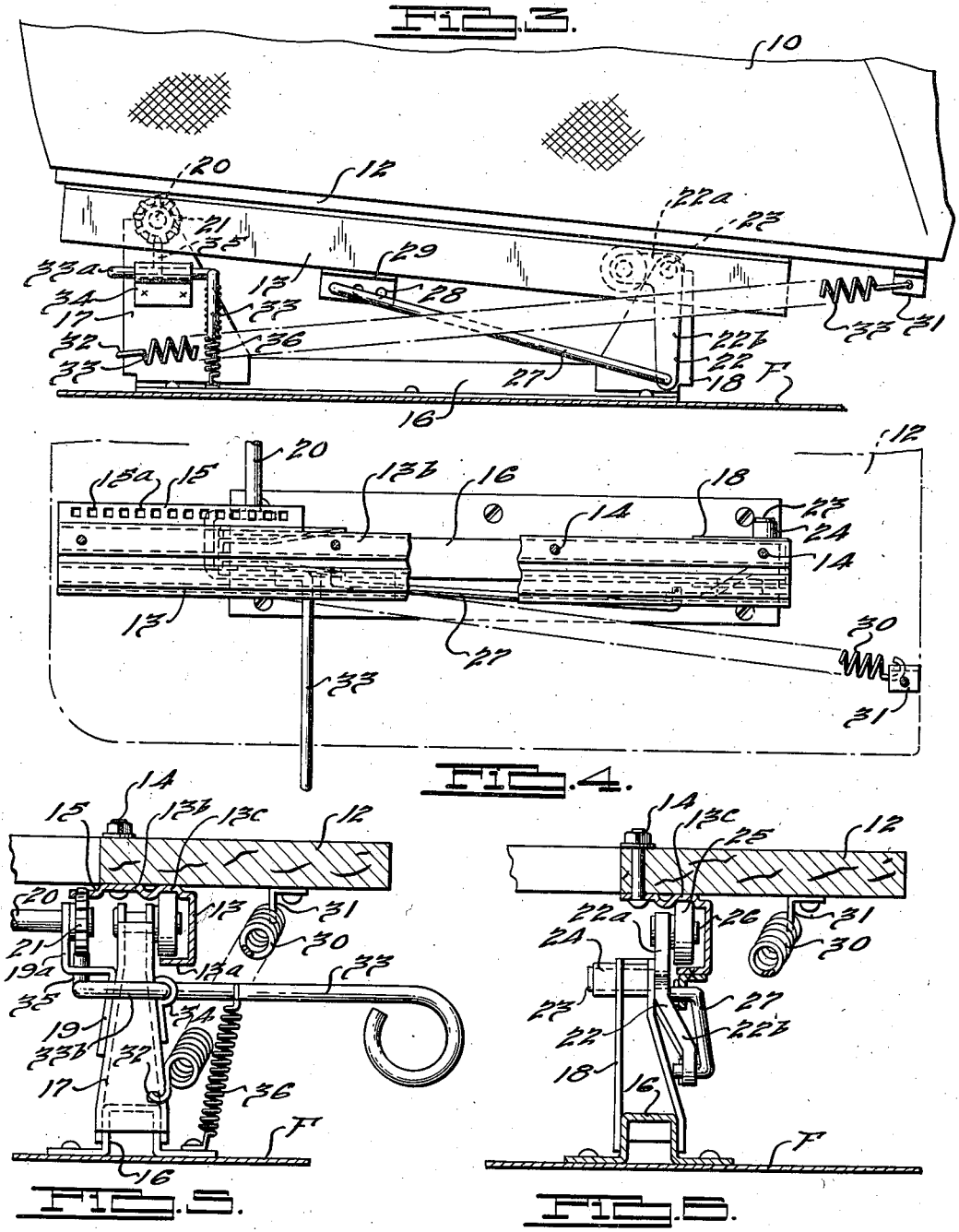
INVENTOR
Jack A. Lawler.
BY
Dike, Calver & Gray
ATTORNEYS.

Patented Nov. 4, 1941

2,261,728

UNITED STATES PATENT OFFICE 2,261,728

ADJUSTABLE SEAT

Jack A. Lawler, Franklin, Mich., assignor to Marvel Equipment Corporation, Detroit, Mich., a corporation of Michigan Application January 9, 1939, Serial No. 249,906

8 Claims. (Cl. 155—14)

This invention relates to seat structures for vehicle bodies and particularly the bodies of motor vehicles. The invention is especially useful in connection with adjustable seats for automobiles, such as the front seats thereof, wherein it is desirable, for example, not only to effect adjustments of the seat in a longitudinal direction with respect to the steering wheel and control pedals but also to adjust the height of the seat.

An object of the invention is to provide improved means whereby the seat may be adjusted longitudinally with respect to the vehicle and also vertically in response to the longitudinal adjustments.

Another object is to provide a longitudinally adjustable seat and means operable in response to the longitudinal movements of the seat and controlled thereby for effecting vertical movement of the seat.

A further object is to provide an adjustable seat of the foregoing character which is simplified and economical in construction, durable, compact and efficient in use.

Other objects of this invention will appear in the following description and appended claims, reference being had to the accompanying drawings forming a part of this specification wherein like reference characters designate corresponding parts in the several views.

Fig. 1 is a front elevation of a seat structure embodying the present invention.

Fig. 2 is a side elevation of the seat structure showing the seat in one position of adjustment.

Fig. 3 is a fragmentary side elevation, somewhat similar to Fig. 2, but on a smaller scale, illustrating another position of adjustment of the seat.

Fig. 4 is a horizontal section taken substantially through lines 4—4 of Fig. 2 looking in the direction of the arrows, the view being taken on a reduced scale.

Fig. 5 is a vertical section taken substantially through lines 5—5 of Fig. 2 looking in the direction of the arrows.

Fig. 6 is a vertical section taken substantially through lines 6—6 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, one embodiment of the present invention as applied to an adjustable front seat for an automobile body. It will be understood, however, that the invention in its broader aspects is susceptible of other adaptations. The seat structure, as illustrated in Figs. 1 and 2, comprises an upholstered seat cushion 10 and an upholstered back cushion 11 carried by a suitable base frame 12. Extending longitudinally of the base frame 12 at each lateral side of the seat is a metallic guide channel 13. Each channel 13 comprises a vertical web terminating at its lower edge in an inturned flange 13a. The channel, in addition, has a relatively wide top flange 13b which is secured to the bottom of the frame 13 as by means of bolts and nuts 14. Extended laterally from the flange 13b at the front end of each channel 13 and formed integrally therewith is a rack member 15 having a series of spaced holes 15a.

Mounted upon the floor F of the vehicle body are a pair of spaced inverted channel members 16 which are secured to the floor and which extend in parallelism adjacent opposite sides of the seat structure. The seat at each lateral side thereof is supported through the medium of a pair of upright supporting members 17 and 18 which are spaced apart in a longitudinal direction, each of these supporting members being in the form of a channel securely fastened, as by spot welding, to the base members 16. Attached, as by spot welding, to the inner face of each of the upright supports 17 adjacent the front of the seat is a generally Z-shaped bracket 19 having an upward extension 19a apertured to receive a cross shaft 20 which is herein termed, for convenience, an equalizer shaft. The shaft 20 is rotatable within the brackets 19 at opposite sides of the seat and fastened to opposite ends of the shaft are gears 21 having teeth projecting into the rack holes 15a of the rack members 15. Thus, the forward end of the seat is slidingly supported upon the spaced uprights 17 through the medium of the gears 21 meshing with the racks 15 and connected together for rotation in unison through the medium of the equalizer shaft 20.

In the present instance the rear end of the seat is supported for adjustment in a vertical direction in response to the forward and rearward travel of the seat when moved by the occupant to adjust its position in a longitudinal direction. The rear supporting means in the present instance takes the form of a bell crank lever 22 pivotally mounted through the medium of a pivot pin or stud 23 upon the upper end of each of the laterally spaced uprights 18. The pivot pin or stud 23, which projects inwardly from each of the levers 22, is journalled in a bearing 24 in the upper end of the support 18. Each lever has a relatively short upwardly extending arm 22a carrying a roller 25 which is mounted for rotation upon a stud or pin 26 secured to the outer end of the arm 22a. Each roller 25 engages and travels within a correspondingly shaped guide channel or groove 13c rolled or formed in the upper flange 13b of the channel guide 13. Each lever 22 has an angularly and preferably forwardly extending longer arm 22b having at its end an eye or aperture within which is attached the hooked or bent end of a rod or link 27. The forward end of each rod or link 27 is bent inwardly for releasable attachment within any one of a series of holes or apertures 28 in an angle bracket 29 spot welded to the bottom flange 13a of the guide channel 13.

A return spring 30 of the tension type is utilized for the purpose of assisting in moving the seat in a forward direction. This spring has its rear end connected to an angle bracket 31 secured to the bottom of the seat frame 12 and its forward end secured at 32 to the upright supporting member 17. Thus, when the seat is in its normal rearward position the spring is under tension and upon releasing the seat for forward adjustment the spring will assist in moving the seat forwardly.

The seat may be latched or locked in any one of its adjusted positions by means of a latch device or dog cooperable with one of the gears 21. The locking mechanism comprises a suitable handle 33 having a bent portion 33a journalled within a bracket 34 secured to one of the uprights 17. The rod 33 of the operator is bent around the upright 17 as at 33b and is provided with a vertical latch member 35 adapted to fit into any one of the spaces between the teeth of the gear 21. The handle 33 is normally held in locking position by means of a tension spring 36. Thus, by lifting the handle 33 the latch member 35 will be withdrawn from the gear 21 thereby permitting the seat to be shifted forwardly or rearwardly upon the pairs of gears 21 and rollers 25. The spring 36 will automatically return the latch 35 to its latching position upon releasing the handle 33.

In Fig. 3 the seat is illustrated in its rearward position of adjustment. It will be seen that upon releasing the latch 35 and shifting the seat forwardly the forward travel of the seat will cause a corresponding movement of the links 27 thereby swinging the arms 22b of the levers 22 forwardly about the pivots 23 and consequently rocking the shorter arms 22a of the levers upwardly. This action results in elevating the rollers 25 at opposite sides of the seat and thus raising the rear end of the seat as it travels forwardly, the seat at the same time being supported upon the rollers 25 which provide an anti-friction medium to facilitate sliding movement of the seat. Vice versa, when the seat is shifted rearwardly from its position of Fig. 2 the links 27, moving rearwardly in an endwise direction, will turn the bell crank levers 22 so as to lower the rollers 25 whereby the rear end of the seat will be lowered in a corresponding manner. It will also be seen that the supporting rollers 25 may be set in any given position of adjustment by connecting the forward ends of the links 27 in any one of the holes 28. It will be apparent that by changing the point of connection of the link 27 with the bracket 29 the lever 22 will be rotated slightly to elevate or lower the roller 25 and provide a corresponding vertical adjustment for the seat at any given position thereof. Thus, a very simple, efficient and positive means for raising and lowering the seat in response to the longitudinal travel thereof is provided by virtue of the present invention and a wide range of adjustments is thus achieved.

In the present embodiment only the rear end of the seat is shown as supported by the rollers 25 for vertical movement in response to the vertical movements of the rollers. However, the invention contemplates the provision of substantially a similar set of lever supported rollers at the front end of the seat either alone or in conjunction with the set of rollers 25 herein shown. The rollers at the front may be mounted in the same manner except that the bell crank levers can be reversed and the links 27 extended rearwardly to apertured brackets 29 near the rear ends of the guides 13. Hence, when the seat is slid forwardly or rearwardly the two sets of rollers will be simultaneously elevated or lowered thereby raising or lowering the entire seat bodily.

I claim:

1. In a seat structure, a seat, fixed supporting means below the seat, longitudinal guides on the bottom of the seat at opposite sides thereof, rollers adapted to engage said guides and support the seat, bell crank levers carrying said rollers and pivoted on the supporting means, and links connecting the bell crank levers to the seat.

2. A seat structure according to claim 1 comprising means for adjusting said links to adjust angularly the levers.

3. In a seat structure, a seat, means supporting said seat for longitudinal travel therealong including a fixed support below the seat, a lever pivoted intermediate its ends to the support for swinging movement, a roller mounted at one end of the lever and operatively engaging the seat, and a link extending longitudinally of the seat and connecting the opposite end of the lever with the seat and adapted to swing the lever to impart vertical movement to the roller and to the seat in response to longitudinal travel of the seat.

4. In a seat structure, a seat, means supporting said seat for longitudinal travel therealong including a fixed support below the seat, a lever pivoted intermediate its ends to the support for swinging movement, a roller mounted at the upper end of the lever and operatively engaging the seat, and a link extending longitudinally of the seat and connecting the lower end of the lever with the seat and adapted to swing the lever to impart vertical movement to the roller and to the seat in response to longitudinal travel of the seat.

5. In a seat structure, a seat, means supporting said seat for longitudinal travel therealong including a fixed support below the seat, a lever pivoted intermediate its ends to the support for swinging movement, a roller mounted at one end of the lever and operatively engaging the seat, a link extending longitudinally of the seat and connecting the opposite end of the lever with the seat and adapted to swing the lever to impart vertical movement to the roller and to the seat in response to longitudinal travel of the seat, and means whereby the range of vertical movement of the roller may be varied.

6. In a seat structure, a seat, means supporting said seat for longitudinal travel therealong including a fixed support below the seat, a lever pivoted intermediate its ends to the support for swinging movement, a roller mounted at the upper end of the lever and operatively engaging the seat, a link extending longitudinally of the seat and connecting the lower end of the lever with the seat and adapted to swing the lever to impart vertical movement to the roller and to the seat in response to longitudinal travel of the seat, and means for initially varying the position of said link whereby the range of vertical movement of the roller may be varied.

7. In an adjustable seat structure, a seat, supporting means for the seat permitting fore and aft longitudinal travel thereof and including roller means upon which the rear end of the seat is adapted to travel, means connected to the seat and also to a fixed support and movable in response to travel of the seat in a forward direction for raising said roller means to elevate the rear end of the seat, and means for varying longitudinally the point of connection of said second named means with the seat.

8. In an adjustable seat structure, a seat, means for supporting said seat for fore and aft longitudinal travel therealong including roller means upon which the forward end of the seat is adapted to travel and roller means upon which the rear end of the seat is adapted to travel, a lever pivoted on the support and carrying one of said roller means, a connection between the lever and seat effective to swing the lever and impart vertical movement to the roller means and the seat in response to longitudinal movement of the seat, and means for varying longitudinally the point of connection between said lever and seat.

JACK A. LAWLER.